United States Patent

[11] 3,558,876

[72] Inventors Leonard Tillman
Douglaston;
Arthur J. Glazar, Kings Park, N.Y.
[21] Appl. No. 777,957
[22] Filed Oct. 16, 1968
[45] Patented Jan. 26, 1971
[73] Assignee Servo Corporation of America
Hicksville, N.Y.
a corporation of New York

[54] TRAIN WHEEL DEFECT DETECTOR
10 Claims, 3 Drawing Figs.
[52] U.S. Cl. ................................................ 246/169,
246/246
[51] Int. Cl. ................................................ B61l 1/06
[50] Field of Search ................................. 246/169,
169.5, 245, 246, 251

[56] References Cited
UNITED STATES PATENTS
2,076,928 4/1937 Witmer .................... 246/251
3,110,463 11/1963 Legg ........................ 246/246
3,116,044 12/1963 Stanley .................... 246/246

Primary Examiner—Drayton E. Hoffman
Assistant Examiner—George H. Libman
Attorney—Kane, Dalsimer, Kane, Sullivan & Kurucz ABSTRACT: A railroad wheel defect-detecting device is described. An accelerometer senses the vibrations induced in a test rail by a railroad wheel traveling thereon. The test rail is vibrationally isolated from adjacent train tracks and ground vibrations to permit sensing of train wheel defects such as flat spots on wheels, loose couplings, dragging equipment and the like. Defects are recognized when the sensed vibrations exceed preselected maximum tolerable levels, said levels being fixed or automatically regulated to compensate for varying train conditions. Identification of each wheel having a defect is provided as well as optional car identification.

INVENTORS
LEONARD TILLMAN
ARTHUR J. GLAZAR
BY
Hopgood & Calimafde
ATTORNEYS

TRAIN WHEEL DEFECT DETECTOR

This invention relates to a device for the detection of railroad wheel carriage defects evidenced by unusual vibrations in the railroad wheel.

The early detection of defects in railway wheel carriages is a critical preventive maintenance function. Although numerous devices have been proposed to detect wheel bearing defects evidenced by unusual temperatures, it has been extremely difficult to detect railroad wheel defects evidenced by unusual vibrations such as produced periodically from flat spots or those of larger than usual magnitudes produced by loose couplings, dragging equipment and the like. Early detection of unusual vibrations can provide valuable preventive maintenance information and help to prevent accelerated destruction of a wheel carriage, the car to which it is attached and even an entire train where derailment might ensue from total destruction of the wheel carriage assembly.

Flat spots in wheels often arise from sliding wheels locked by excessive braking. Once such a flat spot has developed on a wheel, its continued use is likely to accelerate the defect. The flat spot on the wheel induces periodic vibrations of excessive magnitudes and imposes an unbalanced wear on the wheel bearing.

The early detection of such vibrationally evidenced defects is therefore of utility both in the sense of safety and maintenance. However, these defects are extremely difficult to detect by visual inspections within a railroad maintenance yard where the wheel is standing still.

Furthermore, defects evidenced by vibrations may be speed sensitive, i.e. at certain speeds resonance conditions might prevail and produce vibrations of unusual magnitudes. The wheel speeds at which these resonances occur may in turn vary depending upon, for instance, the load supported by the car wheel.

It is therefore an object of this invention to provide a wheel carriage defect detector for a moving train.

It is a further object of this invention to provide a device for the detection of flat spots on a wheel of a moving train.

It is another object of this invention to provide a device for the detection of wheel carriage defects in a train under actual use conditions.

It is still further an object of this invention to provide a wheel carriage defect detector capable of monitoring all wheel carriages and wheel axles of a moving train and produce a useful interface with a data processor for recording and identifying the location of the defective wheel conditions on the train.

These objects are accomplished by our invention, several embodiments of which are hereinafter described in conjunction with the FIGS. wherein.

Briefly stated, our invention contemplates the detection of vibrations of unusual magnitude in a wheel of a railroad car by providing a test rail in alignment with track-supporting rail, where the test rail is vibrationally isolated from the sources of vibrations such as other railroad wheels. The length of the test rail is selected so that but one railroad car wheel may pass over the test rail at any one time. Test rail vibrations such as imparted by a rail car wheel traveling thereover are sensed and a signal representative of the sensed vibrations is compared within a threshold network to produce a wheel defect signal when the vibrations exceed a preselected level.

Where a wheel has a flat spot the vibration or shock induced by the flat spot is synchronized with the rotation of the wheel. With flat spot detection it is, therefore, necessary to bring the entire circumference of the railroad wheel in contact with a test rail. In such case the total test rail length must be preferably at least as long as the entire circumference of the largest rail wheel expected to be inspected.

Rail wheels in common use vary in diameter from 27 inches to 39 inches which corresponds respectively to about 85 inches and 122 inches circumferential lengths. Since a requirement is imposed on the wheel defect detector that but one wheel at any one time is in contact with a test rail, the closest spacing between wheel axles, i.e. the wheelbase, must be taken into account in selecting the length of a test rail. Some railroad cars have wheelbases which are less than a circumferential length of a wheel. In the latter case, the use of a test rail of a length equal to or greater than a wheel circumference would result in two wheels being on the test rail at one time. Since a test rail must be at least as long as the circumferential length of a wheel to accurately detect flat spots, the selection of a test rail presents a dilemma.

A first solution to the dilemma is suggested by the assumption that on some tracks the train cars do not have wheelbases which are less than the circumferential length of a wheel. Accordingly the test rail may be slightly longer than a wheel circumference without having two wheels on the rail at the same time. This solution, however, is but valid for limited applications, and a more general solution is preferred for trains formed of cars with a variety of wheel sizes and wheelbases.

Figure 1:
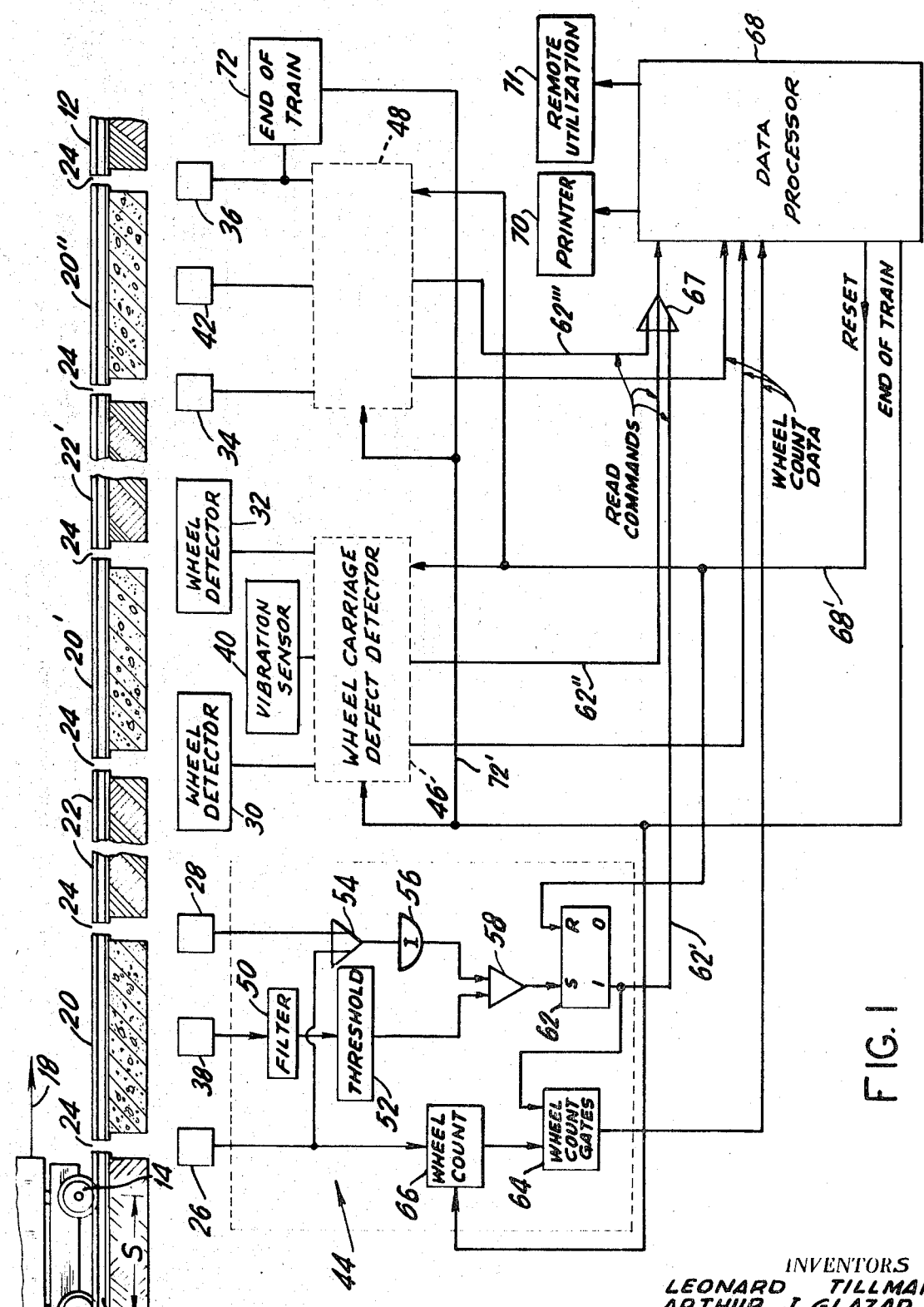
FIG. 1 is a schematic view of a rail wheel vibration detection device operating on one side of a track in accordance with a first embodiment of this invention.

In situations where a greater variety of rail cars are encountered the dilemma may be resolved by utilizing a multiple number of short test rails which are selectively spaced from one another to assure that the entire circumference of a wheel of any size within a preselected range may be accommodated with any wheelbase spacings also occurring within a selected range. Thus, where wheel diameters vary from 27 inches to 39 inches, the wheelbase spacings may vary from 60 inches to 108 inches, it being realized that with larger wheels, the wheel spacings are also increased. Within the last stated ranges, three short test rail sections may be used, selectively spaced from one another by separator rails of such length that any wheel with a diameter within the range from 27 inches to 39 inches will always have its entire circumferential surface exposed to the test rails, thus assuring the detection of flat spots. FIG. 1 illustrates a wheel defect detector device wherein three test rails are used. It should be realized that more test rails could be employed to accommodate a still great variety of wheel sizes and bases, but for economy the three-section test rail system of FIG. 1 suffices and in fact covers the great majority of wheel sizes and wheel bases in common use today.

In the embodiment of FIG. 1 a train car 10 is partially shown traveling on conventional supporting rails, one of which 12 is visible in the view of FIG. 1. Two car wheels 14—14' are shown coupled to a common wheel carriage 16 with a wheel base S between the axles of the wheels. The train is traveling in the direction of the arrow 18. The wheel base S is not in scale with the other rail sections shown in FIG. 1. In spaced alignment with the supporting rail 12 are three test rails 20-20'-20". These test rails are separated from one another by separator rails 22 and 22' shown in broken fashion. The separator rails may be regular supporting rail sections. The test rails 20-20'-20" are vibrationally isolated from one another and the other rail sections. This may be done by use of conventional seismic techniques utilizing concrete isolation platforms supported by deep concrete foundations. Such isolation is necessary to prevent ground and rail coupled disturbances from affecting the sensing equipment.

The rails are each separated from one another by normal rail joint spacings 24, each approximately one-half inch long. Adjacent these joints and sequentially arranged in accordance with the direction of travel of the rail cars are six wheel detectors 26, 28, 30, 32, 34 and 36. Such detectors may be as described in the patent to Gallagher et al. 3,151,827. These wheel detectors provide an electrical signal indicative of a wheel about to cross onto a test rail with wheel detectors 26, 30, 34 or about to leave a test rail with wheel detectors 28, 32, 36. Test rail vibration sensors 38, 40, 42 are provided in vibrational contact with test rails 20, 20', 20" respectively. The vibration sensors may be accelerometers which produce electrical signals representative of the sensed vibrations. The wheel detectors are so mounted within or near the rail spacings that blanking pulses may be initiated from their outputs to effectively block the outputs from test rail vibrations sensors 38–40–42 as car wheels move across the joints 24 between rail sections.

For the embodiment shown in FIG. 1, the lengths of the several rail sections 20–22–20'–22'20" are respectively 59 inches, 88 inches, 59 inches, 108 inches and 59 inches. These lengths assure that any wheel with a diameter within the range from 27 inches to 39 inches will have its entire circumference exposed to a test rail. Furthermore, the 59 inch long test rails assure that cars with 60 inch wheelbases will not produce two wheels on a test rail at the same time. An advantage presented by the spaced test rails lies in the ability of the detection of vibrations of relatively low periodicity, i.e. the stretched out detection system is more likely to detect such vibrations than a short test rail detection system.

Associated with each test rail 20, 20', 20" are wheel carriage defect detector circuits 44, 46 and 48. They are alike and a description of one, 44, will suffice. A filter 50 has its input coupled to the output of accelerometer 38 so that some minimum smoothing of the sensed vibration signals is produced. The filter 50 is optional and may even be selectively employed as hereinafter described for automatic threshold control in connection with FIG. 3.

A threshold circuit 52 is provided and coupled to the output of filter 50. Such a circuit may be made for instance by a logic operational amplifier, having one input biased by a fixed voltage. The fixed voltage represents the maximum normal vibration level for railroad wheels. Such maximum signal level may be, for instance, ascertained by running a plurality of normal train wheels at varying speeds over a test rail section and monitoring the time history of the accelerometer output for each wheel. The maximum vibration level for normal wheels may thus be ascertained and used to set a useful threshold level. Such time history is also useful in determining the degree of filtering necessary and permissible to be able to detect peak vibrations induced in the test rail by defects in the wheel carriage.

Since the crossing of the wheel joints 24 is accompanied by strong shocks, blanking pulses to block and prevent outputs from the threshold network 52 from indicating a defect during these wheel crossings are provided. The blocking function is obtained by deriving a pulse of predetermined length from the wheel detectors 26—28. Thus, wheel detector 26, for instance, being mounted adjacent the rail joint 24, but on rail 12, produces also with the use of a conventional pulse generator (not shown) a pulse of predetermined length. The pulse length is such that the threshold 52 output is blocked for the time necessary for a wheel to cross joint 24 plus the time necessary for the shock induced by the wheel to decay to below threshold-triggering levels. Since the speed of sound in rails is very high compared to the highest possible train speed, the time needed for the "crossing shock" to reach the accelerometer may be ignored in relation to the decay time.

Threshold blocking is accomplished by passing the output of both wheel detectors 26 and 28 through OR gate 54 which in turn acts through inverter 56 on AND gate 58. Hence, only for the duration of a pulse from either wheel detector 26 or 28 will the AND gate 58 be blocked.

The output for AND gate 58 is connected to the SET input of an alarm flip-flop 62. The output of this alarm flip-flop 62 serves to enable a set of wheel count gates 64 which permits the output of a wheel counter 66 to be transmitted to a data processor 68. The wheel counter 66 receives wheel count impulses from wheel detector 26. Thus, the wheel counter 66 is advanced by one count each time a wheel traverses detector 26. The output of the alarm flip-flop 62 is also applied along line 62' to command the data processor to read the gated wheel count. The alarm flip-flop outputs 62', 62", 62''' of the three defect detector circuits 44, 46 and 48 are combined in OR gate 67, such that an alarm detected by any of the three units will generate a read command to the data processor.

An alternative method of identifying the location of the defect is to supply car sound rather than wheel count to the data processor. This can readily be accomplished by interposing a divide-by-four scaling counter between the wheel sensor 26 and the counter 66. Counter 66 then becomes a "car counter" rather than a wheel counter, and the gates 64 then become "car counter gates" rather than wheel counter gates. This option, however, is useful only where trains are limited to 4-axle cars, such as in rapid transit systems.

The data processor 68 provides a reset pulse on line 68' to the alarm flip-flop of each circuit 44, 46 and 48 after reading and storing the wheel count (or car count) at which a fault was detected.

The data processor can take many forms depending upon how the information is to be used. In the embodiment depicted in FIG. 1, the data processor 68 actuates a printer 70 which displays the defect data. In such an embodiment, the data processor might also include a date and time generator such that date/time information can be printed along with the location of the faults. A remote utilization device is provided any may be used for another form of data presentation such as the activation of a wayside alarm signal to alert the train crew that a fault has been detected.

An end-of-train pulse os obtained from a network 72 and applied as a reset on line 72' to the wheel counters (or car counters). The network 72 generates an output pulse whenever the time interval between pulses from the final wheel sensor 36 exceeds some predetermined maximum. This maximum time may be computed from a knowledge of the minimum anticipated train speed and the maximum anticipated distance between wheels. For example, if the minimum train speed is $V$ft./sec. and the maximum distance between wheels is $d$ feet, wheel sensor 36 will produce output pulses at least every $\frac{d}{v}$ seconds. The network 72, therefore, can be designed to generate an end-of-train signal when the time interval between successive pulses from wheel detector 36 exceeds $\frac{d}{v}$ seconds, plus a fixed safety factor. Such end-of-train pulses might also be used to advance a train counter in the data processor, the train count providing an additional piece of identification data which can be printed out.

Figure 2:
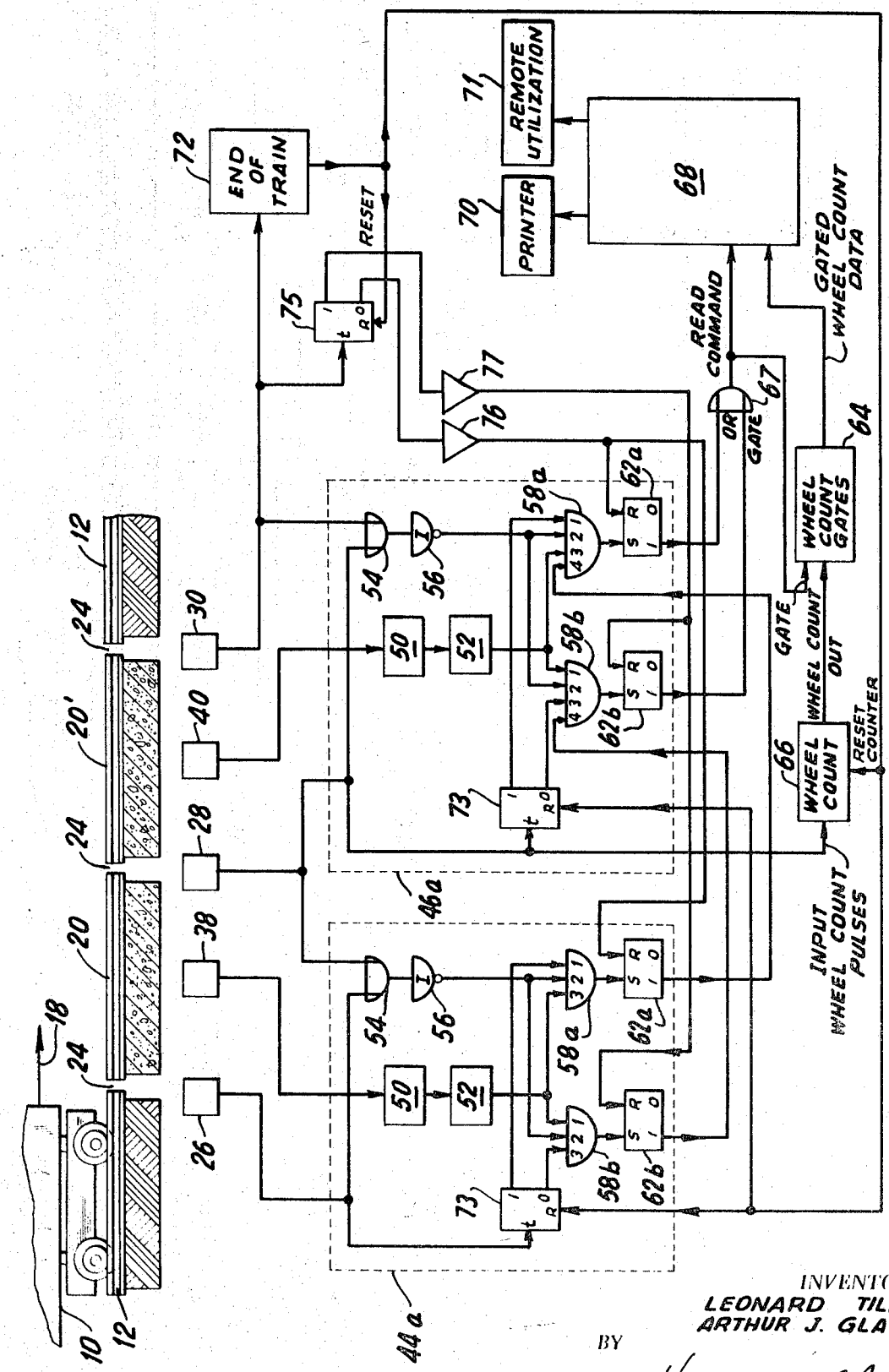
FIG. 2 is a schematic view of a rail wheel detection system wherein two test rail detectors are used, one of which provides a verification of the results from the other.

In FIG. 2, a wheel defect detector is shown wherein the test rails 20, 20' are made as long as the circumference of a wheel and it is assumed that wheel bases of shorter length than the test rails will not occur. The test rails 20, 20' are closely spaced to one another and separated by a rail joint 24.

Two wheel defect circuits 44a and 46a, similar to 44 and 46 in FIG. 1, are employed. Wheel trips 26, 28 and 30 and vibration sensors 38, 40 provide signals as in the configuration of FIG. 1. In this case, however, circuit 46a coacts with circuit 44a to confirm the existence of a defect detected in circuit 44a.

A study of FIG. 2 shows the similarity of circuits 44a and 46a with circuits 44 and 46 in FIG. 1. The principal difference is that two alarm flip-flop 62a and 62b are employed. The purpose of using two alarm flip-flop is to enable the storage of alarms for each of two successive wheels which enter the test sections 20–20'. The threshold alarm signals are steered to the appropriate flip-flop by means of the steering gates 58a and 58b and a counting flip-flop 73 which supplies the steering signal by alternating its output as each wheel crosses the wheel sensor. For example, consider the action of circuit 44a as a car 10 approaches test section 20 with a flat spot on the first wheel. Counting flipflop 73 is initially in the zero state by virtue of a reset applied to its R terminal from a prior end-of-train signal from circuit 72. As the first wheel traverses sensor 26, a blanking pulse is generated as described in the discussion of FIG. 1. In addition, flipflop 73 is toggled to the one state. In the one stage, steering gate 58a is enabled and 58b is disabled so that a threshold signal arising from the contact of the flat spot with test rail 20 is routed through 58a into the set terminal of flip-flop 62a.

As this same wheel progresses to the second test section 20', a similar sequence of events occurs in circuit 46a, resulting in the setting of flip-flop 62a in circuit 46a. Note, however, that the setting of this latter flip-flop is contingent upon the prior setting of flip-flop 62a in circuit 44a by virtue of input number 4 of the steering gate 58a in circuit 46a. Thus, a read command to the data processor is generated only if both circuits 44a and 46a detect a threshold signal from the same wheel. A similar line of reasoning applies to the second wheel. A flat spot on the second wheel will first set flip-flop 62b in circuit 44a and then set flip-flop 62b in circuit 46a resulting in a read command to the data processor. Both read commands from flip-flops 62a and 62b in circuit 46a are connected to the data processor 68 after passage through an OR circuit 67.

Circuits 44a and 46b therefore act to verify one another, and the possibility of false alarm signals which might arise as a result of random vibration peaks is minimized. The circuit configuration thus discriminates against excessive vibration signals which are not associated with wheel rotation periodicity.

The problem of resetting the alarm flip-flops 62a and 62b in the configuration of FIG. 2 is complicated by the fact that they contain time sequential information. They cannot therefore be reset by the data processor as before. Rather, this is accomplished by another counting flip-flop 75 in conjunction with pulse generators 76—77. Pulse generator 76 produces reset pulses on odd-numbered wheels to reset flip-flops 62a, while pulse generator 77 produces reset pulses on even-numbered wheels to reset flip-flops 62b. This is necessary because of the possibility that one, but not both of the flip-flops (62a in circuits 44a and 46a, for example) may be set ny a random occurrence of a high level vibration. In such a case, no read command is generated and the data processor cannot determine that a reset is required.

The variable car loadings, construction and the like may conceivably render a fixed minimum threshold value used in the circuit 52 not practical under all circumstances, despite the smoothing of the accelerometer outputs by filter 50. In such case, an automatic threshold varying device may be employed as described in relation to FIG. 3, wherein similar numbers designate similar items used in FIG. 1.

Figure 3:
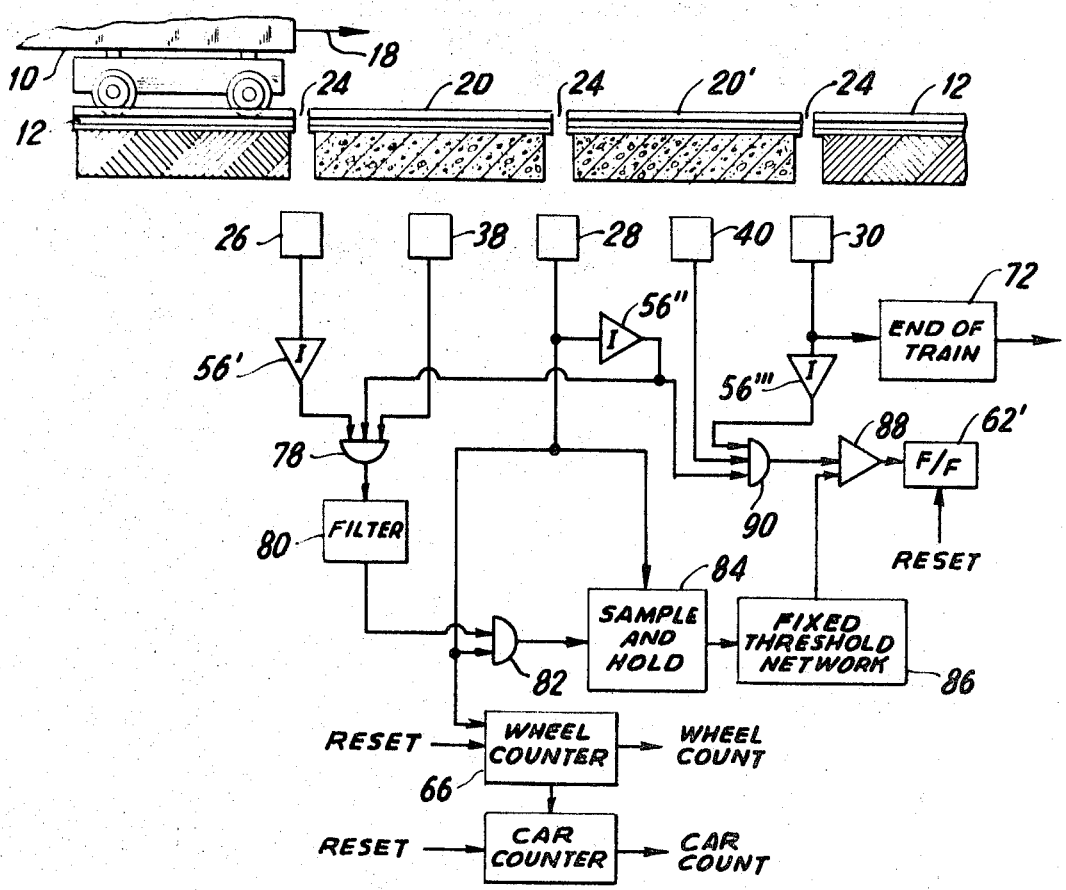
FIG. 3 is a schematic view similar to that of FIG. 1 of a second embodiment of this invention and shows an automatic threshold regulation device for the detection of unusual vibrations in a test rail.

In FIG. 3, two test rail sections 20—20' are positioned end to end and vibrationally isolated from one another as well as ground coupled disturbances. Test rail 20 serves to generate, in conjunction with associated circuitry, a reference signal indicative of the average or RMS. (root mean square) vibration level of a wheel traveling over test rails. This reference signal may then be used in conjunction with the circuitry associated with test rail 20' to provide a defect signal when the vibration level of a wheel exceeds the reference signal. The lengths of these test rail sections 20—20' need not be the same, though neither may be longer than the wheel base and test rail 20' must be as long as or slightly longer than the circumferential length of a wheel.

Again, wheel trips 26, 28 and 30 are placed adjacent rail joints 24 and vibration sensors 38—40 are used to sense the vibrations in test rails 20—20' respectively. The outputs of wheel detectors 26—28—30 are each passed through inverters 56'—56''—56'''. These inverters serve the same function as inverter 54 of FIG. 1. The outputs from inverters 56' and 56'' as well as the output from vibration sensor 38 are applied to an analogue logic gate 78. The polarities from inverters 56' and 56'' are such that only when a wheel is detected will the inverters effectively blank or inhibit the input of gate 78.

The analogue output from gate 78 is fed to a filter 80. This filter is designed to either produce the RMS value of the vibration levels or the average value. In this embodiment an average signal is obtained from filter 80 by providing it with a sufficiently long time constant. The time constant is preferably set commensurate with normal travel times of a wheel over test rail 20 but can be varied to accommodate different train wheel speeds.

The output of the filter 80 is coupled through an analogue gate 82 to a sample and hold circuit 84 which stores the average signal level established at the output of the filter 80 upon enabling of the gate 82 by wheel trip signal 28 applied thereto. When a wheel reaches the end of test rail 20 as detected by wheel trip 28, the signal from the latter actuates the sample and hold circuit 84. While the wheel proceeds on test rail 20' the average vibration level signal stored in sample and hold circuit 84 is applied to and biases a fixed threshold network 86.

The fixed threshold network produces a voltage having a magnitude which usually exceeds the sample and hold signal and is preselected as indicative of a defect in a wheel. This may be accomplished by applying the sample and hold signal to an operational summing amplifier having a high input impedance and to which is added an input voltage of a magnitude necessary to make up the preselected defect signal level. Usually this input voltage is fixed. The preselected defect reference signal from the fixed threshold network is then applied to one of two inputs of an analogue operational amplifier 88 which acts as a differential amplifier.

Blanking signals from inverters 56'' and 56''' are applied with the output of vibration sensor 40 to an analogue gate 90 which in turn has its output coupled to the other input of differential operational amplifier 88.

The output of operational amplifier 88 thus represents a voltage which, either by its polarity of by its magnitude, indicates the detection of a defect in the wheel passing over the rail 20'. Since a defect indicating output from amplifier 88 occurs but momentarily, a more permanent defect indication is obtained by applying the output of amplifier 88 to a flip-flop 62' like flip-flop 62 of FIG. 1.

Other functions of networks in FIG. 3 are like those in FIG. 1, such as the end of train indicator, the wheel counter and the car counter. Also the data processor shown in FIG. 1 is used with the defect detection system of FIG. 3 in a similar manner.

Having thus described our invention for an automatic wheel defect detector, certain unique advances may be appreciated. The defects may be detected for a moving train at variable speeds, thus allowing the detection of unusual resonances as well as full automatic handling of all data generated by the wheel defection system.

While the present invention has been described in conjunction with preferred embodiments, it may be modified without departing from the spirit and scope of the invention as defined by the following claims.

We claim:

1. A wheel carriage defect detector for a railroad car moving on support rails comprising in combination:
   a first test rail mounted in spaced alignment with a supporting rail and vibrationally isolated therefrom;
   means for sensing the vibrations induced by a railroad wheel traveling on said first test rail and producing a first vibration signal indicative thereof;
   a second test rail mounted in spaced alignment with the first test rail on the side opposite to the direction of movement of the wheel and vibrationally isolated from the first test rail and the supporting rail;
   means for sensing the vibrations induced by said traveling railroad wheel in said second test rail and producing a signal indicative of the average thereof; and
   means responsive to said selected vibration signal and the first vibration signal for producing a defect signal when said first vibration signal exceeds said selected vibration signal by a preselected amount.

2. A device as received in claim 1, wherein said average signal-producing means comprises:
   an accelerometer mounted on said second test rail;
   a filter driven by the accelerometer output; and
   a sampling and hold circuit detecting and storing the filtered accelerometer signal at a predetermined time.

3. A device as recited in claim 2, and further comprising:
   means mounted adjacent the spacing between the first test rail and the second test rail for detecting when said railroad wheel is about to travel over said second test rail and producing a wheel signal indicative thereof;

said wheel signal actuating the sampling and hold circuit; and a fixed threshold circuit biased by the sampled and stored signal to produce a preselected defect reference signal and wherein the defect signal producing means comprises a differential amplifier coupled to the defect reference signal and the first vibration signal.

4. A wheel carriage defect detector for a railroad car moving on support rails comprising in combination:

a plurality of spaced test rails mounted in spaced alignment with one another and with a supporting rail and vibrationally isolated therefrom and from one another;

a separator rail spaced between and in alignment with said test rails;

means sensing vibrations induced in individual test rails by moving railroad wheels and producing electrical signals individually indicative thereof;

a plurality of wheel detectors mounted adjacent the spaces between the rails and producing electrical wheel signals indicative of the presence of a wheel;

means controlled by the wheel signals and responsive to the vibration signals for producing a plurality of wheel defect signals when said vibration signals exceed predetermined levels, and said spaced test rails and separator rails having preselected lengths, where the total length of said test rails is greater than the maximum common railroad wheel circumferential length and where the separator rail has a length commensurate with that necessary to bring the entire circumference of the common railroad wheel in contact with a test rail.

5. A device as recited in claim 4 wherein said wheel detectors includes a first wheel detector adjacent the spacing between the supporting rails and test rail;

a wheel counter driven by the electrical signal from said first wheel detector for counting the number of wheels.

6. A device as recited in claim 4 wherein the wheel defect-producing means further comprises:

a threshold circuit, driven by the vibration signal;

an AND gate having its input coupled to the vibration signal and the wheel detector signals, said gate being temporarily blocked by the wheel detector signal.

7. A device as recited in claim 5 and further including;

a storage circuit coupled to the output of the gate for storing the detection of a defect by the threshold circuit.

8. A device as recited in claim 5 wherein the wheel counter produced a car count signal indicative of a preselected number of counted wheels, said preselected number being commensurate with an assumed number of wheels per car, and;

a car counter responsive to the car count signal for counting the number of cars.

9. A wheel carriage defect detector for a railroad car moving on support rails comprising in combination:

first and second test rails mounted in spaced alignment with one another and a supporting rail and vibrationally isolated therefrom and from one another;

means for sensing the vibrations induced by a railroad wheel traveling on said first test rail and producing a signal indicative thereof;

means responsive to the sensed vibrations in said first test rail and producing a signal indicative of an average vibration level of the wheel traveling over said test rail;

means sensing the vibrations induced by said railroad wheel traveling on said second test rail and producing a second vibration signal indicative thereof; and means responsive to said selected vibration signal and the second vibration signal for producing a defect signal when said second vibration signal exceeds said average vibration signal by a predetermined amount.

10. A wheel carriage defect detector for a railroad car moving on support rails comprising in combination:

first and second test rails mounted in spaced alignment with one another and vibrationally isolated from the supporting rail;

means for sensing the vibrations induced by a railroad wheel traveling on said first and second test rails and producing first and second signals representative thereof;

means responsive to the first vibration signal for producing a first wheel defect signal when said first vibration signal exceeds a preselected level;

means responsive to the second vibration signal for producing a second wheel defect signal when said second vibration signal exceeds a preselected level and wherein said second wheel defect signal is representative of the same defect represented by said first wheel defect signal; and means actuated by said first wheel defect signal for producing an alarm signal upon the occurrence of said second wheel defect signal.